United States Patent
Kim et al.

(10) Patent No.: US 7,369,207 B2
(45) Date of Patent: May 6, 2008

(54) LIQUID CRYSTAL DISPLAY WITH SPACER POSITIONED WITHIN A HOLE OF A PIXEL ELECTRODE AND A FABRICATING METHOD THEREOF

(75) Inventors: Jeong Hyun Kim, Kunpo-shi (KR); Jae Hong Jun, Seoul (KR); Hyun Kyu Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 722 days.

(21) Appl. No.: 10/273,145

(22) Filed: Oct. 18, 2002

(65) Prior Publication Data
US 2003/0214621 A1 Nov. 20, 2003

(30) Foreign Application Priority Data
May 17, 2002 (KR) .............................. P2002-27309

(51) Int. Cl.
*G02F 1/1339* (2006.01)
(52) U.S. Cl. .................................................. 349/155
(58) Field of Classification Search ................ 349/155, 349/156, 115
See application file for complete search history.

(56) References Cited
U.S. PATENT DOCUMENTS 5,815,232 A * 9/1998 Miyazaki et al. ........... 349/155
6,323,921 B1 * 11/2001 Kurauchi et al. ........... 349/106
6,501,527 B1 * 12/2002 Hirose et al. ............... 349/155
6,724,452 B1 * 4/2004 Takeda et al. .............. 349/139
6,862,052 B2 * 3/2005 Kim ............................ 349/54
6,870,592 B1 * 3/2005 Yamamoto et al. ......... 349/155
2002/0075442 A1 * 6/2002 Yanagawa et al. .......... 349/155

* cited by examiner

*Primary Examiner*—Dung T. Nguyen
*Assistant Examiner*—Richard H Kim
(74) *Attorney, Agent, or Firm*—Morgan, Lewis & Bockius LLP

(57) ABSTRACT

A liquid crystal display device including a substrate, a thin film transistor provided at an area adjacent to an intersection of a gate line and a data line on the substrate, a protective layer provided on the substrate to cover the thin film transistor, a pixel electrode provided on the protective layer and connected through the protective layer to the thin film transistor, a first hole in a surface of the pixel electrode and positioned above an adjacent gate line and a spacer positioned within the first hole. A method of fabricating a liquid crystal display device includes the steps of forming a thin film transistor at an area adjacent an intersection between a gate line and a data line on a substrate, forming a protective layer covering the thin film transistor, forming a pixel electrode provided on the protective layer and passing through the protective layer to be electrically connected to the thin film transistor, defining a hole in a surface of the pixel electrode by patterning the pixel electrode on the protective layer above an adjacent gate line and depositing a spacer into the first hole using an ink-jet device.

4 Claims, 18 Drawing Sheets

LIQUID CRYSTAL DISPLAY WITH SPACER POSITIONED WITHIN A HOLE OF A PIXEL ELECTRODE AND A FABRICATING METHOD THEREOF

The present invention claims the benefit of Korean Patent Application No. P2002-27309 filed in the Republic of Korea on May 17, 2002, which is hereby incorporated by reference in its entirety.

BACKGROUND OF THE INVENTION

1. Field of the Invention

This present invention relates to a liquid crystal display, and more particularly, to a liquid crystal display and a fabricating method thereof wherein a spacer is positioned.

2. Description of the Related Art

Generally, a liquid crystal display (LCD) controls the light transmittance of each liquid crystal cell in response to a video signal. Accordingly, a picture is displayed corresponding to the video signals on an LCD panel having liquid crystal cells arranged in a matrix. To this end, the LCD panel includes an active area having liquid crystal cells arranged in a matrix and driving circuits for driving the liquid crystal cells in the active area.

Referring to FIG. 1, a conventional LCD includes an upper plate consisting of a black matrix 20, a color filter 16, a common electrode 14 and an upper alignment film 12 that are sequentially provided on the upper substrate 11. The conventional LCD also includes a lower plate consisting of a lower substrate 1 on which a thin film transistor (TFT) 25/6/26/27/28/30, a pixel electrode 22 and a lower alignment film 10 are sequentially provided. In addition, the conventional LCD includes a spacer 24 and a liquid crystal (not shown) provided between the upper plate and the lower plate.

In the lower plate, the TFT includes a gate electrode 25 connected to a gate line (not shown), a source electrode 28 connected to a data line (not shown), and a drain electrode 30 connected, via a contact hole 23, to the pixel electrode 22. Further, the TFT includes a gate insulating film 6 for insulating the gate electrode 25, and an active semiconductor layer 26 on the gate insulating film for creating a conductive channel between the source electrode 28 and the drain electrode 30 when a gate voltage is applied to the gate electrode 25. As shown in FIG. 1, ohmic semiconductor layers 27 are provided respectively between the active layer 26 and the source/drain electrodes 28 and 30 and doped with an impurity for an ohmic contact between the active semiconductor layer 26 to the source electrode 28 and between the active semiconductor layer 26 to the drain electrode 30.

When a gate signal is applied to the gate line of the TFT, a data signal from a data line can be switched through the TFT to the pixel electrode 22. As a result, the liquid crystal is rotated by means of a voltage difference between a data signal applied to the pixel electrode 22 via the TFT and a common voltage Vcom applied to a common electrode 14. Accordingly, light transmission quantity through the liquid crystal is determined by the arrangement of the liquid crystal.

The pixel electrode 22 is positioned at an area adjacent to the intersection of a data line and a gate line, and is made from a transparent conductive material having a high light transmittance. The pixel electrode 22 is provided on a protective film 8 that is on the surface of the lower substrate 1, and is electrically connected, via a contact hole 23 in the protective film 8, to the drain electrode 30. An upper portion of the lower substrate 1, provided with the pixel electrode 22, is coated with an alignment film 10 that is subjected to a rubbing process, which completes the assembly of the lower plate.

The black matrix 20 of the upper plate is formed on the upper substrate 11 in correspondence with the TFT area of the lower plate and an area adjacent to the intersection of a gate line and a data line. The black matrix 20 also defines a liquid crystal cell area in which a color filter 16 will be formed. Further, the black matrix 20 plays a role in preventing light leakage and absorbing an external light such that contrast can be enhanced. The color filter 16 is formed in the cell area as defined by the black matrix 20. The color filter 16 specifically transmits a wavelength of light for a certain color, such as red, green or blue colors. The common electrode 14 formed on the color filter 16. The alignment film 12 is formed by coating an alignment material, such as polyimide, on the common electrode 14 and then the rubbing process is carried out.

Ball spacers, like ball spacer 24, are sprinkled onto either one of the upper plate or the lower plate of an LCD panel by means of a jet nozzle to define a gap between the upper plate and the lower plate. The ball spacers should be uniformly distributed for the purpose of keeping a uniform cell gap across the LCD panel. However, it is difficult to uniformly distribute ball spacers due to the randomness in any sprinkling system. If the ball spacers are not uniformly distributed in the LCD panel, the cell gap in individual liquid crystal cells may not be uniform such that a stain-like appearance phenomenon is created in one or more areas on the LCD panel. In addition, if a user applies a pressure to the screen at the exterior of the LCD panel when ball spacers are used, a ripple phenomenon can occur in which the picture on the LCD panel has darkened areas shaped like waves. The darkened wave-shaped areas occur because the ball spacers have been shifted around between the upper plate and the lower plate.

Recently, there has been a study to provide a spacer that is fixed and patterned at a specific location to overcome the disadvantages of the ball spacer 24 and its sprinkling system. Hereinafter, a manufacturing method of the pattern spacer will be described with reference to FIG. 2A to FIG. 2C and FIG. 3. More particularly, FIG. 2A to FIG. 2C are cross-sectional views showing a process of manufacturing a conventional pattern spacer, which will be described in conjunction with FIG. 3, which is a flow chart.

A spacer material 42a, as shown in FIG. 2A is coated onto a substrate 40, as referred to in step S31 of FIG. 3. The substrate 40 can be either one of the upper plate provided or the lower plate provided with the TFT. The spacer material 42a can be a material that is a mixture of a solvent, a binder, a monomer and a photo-initiator. As referred to in step S32 of FIG. 3, the spacer material 42a is subject to a pre-baking to eliminate a solvent within the spacer material 42a, thereby making the spacer material 42a into a paste-like state.

Subsequently, as shown in FIG. 2B, a photo mask 44 having a transmission part 44a shielding part 44b is aligned on the spacer material 42a. As referred to in step S33 of FIG. 3, when ultraviolet (UV) radiation is irradiated onto the spacer material 42a through the photo mask 44, the spacer material corresponding to the transmission part 44a is exposed to the ultraviolet radiation.

As shown in FIG. 2C and referred to in step S34 of FIG. 3, the spacer material 42a is developed. When the spacer material 42a is developed using a negative process, the spacer material 42a that is not exposed to the ultraviolet radiation is removed while the spacer material that is exposed to the ultraviolet radiation is left. When the spacer material 42a is developed using a positive process, the spacer material 42a that is exposed to the ultraviolet radiation is removed while the spacer material that is not exposed to the ultraviolet radiation is left. As referred to in step S35 of FIG. 3, the spacer material 42a is cured to form a spacer 42 having a desired height.

The spacer 42 for keeping a cell gap in the LCD panel can occupy about 20% of the entire area in a liquid crystal cell. If the spacer 42 is formed by the above-mentioned photolithography technique, then more than 95% of the coated spacer material 42a is wasted as a result of a spin-coating process of the photolithographic material. Thus, the conventional photolithography wastes a lot of material in forming the spacer 42 and is inconvenient in that it requires a complex five-step process.

To reduce the waste of material and the number of process step, there has been a spacer formation method suggested using an ink-jet device as shown in FIG. 4A to FIG. 4C. As shown in FIG. 4A, an ink-jet device 50 is aligned to a formation position of a spacer on a substrate 40. In this alignment state, a spacer material 58 is jetted from the ink-jet device 50 to the substrate 40. The substrate 40 corresponds to at least one of the upper and lower plates of a LCD panel. The ink-jet device 50 jets the spacer material 50 using a thermal system or a piezoelectric system. Typically, the latter system is preferred. The ink-jet device 50 using the piezoelectric system consists of a vessel 52 for containing a material to be jetted, and an ink-jet head 54 for jetting a material from the vessel 52.

The vessel 52 is filled with the spacer material 58, and the ink-jet head 54 is provided with a piezoelectric device and a nozzle 56 for jetting the spacer material 58 from the vessel 52. When a voltage is applied to the piezoelectric device, a physical pressure is generated to cause a capillary phenomenon in which a flow path between the vessel 52 and the nozzle 56 repeatedly contracts and relaxes. Due to this capillary phenomenon, the spacer material 58 jets out of the nozzle 56 onto the substrate 40, as shown in FIG. 4B. Then, a curing process is used that exposes the spacer material 58 on the substrate 40 to an ultraviolet ray from a light source 60, as shown in FIG. 4C. Thus, the spacer material 58 can be hardened into a spacer 59 with a width W and a height H, as shown in FIG. 4C.

However, the spacer 58 material is affected by gravity while falling onto the substrate 40, as well as, by being jetted from the ink-jet device 50. Thus, the spacer material has a wide spread or large dispersion on the substrate 40 when forming a spacer 59 of at least a minimum height for keeping the cell gaps between the upper plate and the lower plate of the LCD panel. As a result, it is only possible to obtain a spacer 59 of a certain height corresponding to the maximum width of the spacer 59 on the substrate. If the height of the spacer for keeping a minimum cell gap is not obtained, then brightness and contrast are reduced causing a deterioration of picture quality. If the width of the spacer is too wide for a black matrix area of the upper plate or a TFT area of the lower plate, then aperture area of the LCD panel is reduced.

SUMMARY OF THE INVENTION

Accordingly, the present invention is directed to a liquid crystal display and a fabricating method thereof that substantially obviates one or more of the problems due to limitations and disadvantages of the related art.

An object of the present invention to provide a liquid crystal display device and a fabricating method thereof for easily adjusting a size of a spacer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a liquid crystal display device according to one embodiment of the present invention includes a substrate, a thin film transistor provided at an area adjacent to an intersection of a gate line and a data line on the substrate, a protective layer provided on the substrate to cover the thin film transistor, a pixel electrode provided on the protective layer and connected through the protective layer to the thin film transistor, a first hole in a surface of the pixel electrode and positioned above an adjacent gate line and a spacer positioned within the first hole.

In another embodiment, a liquid crystal display device includes a substrate, a thin film transistor provided at an area adjacent to an intersection of a gate line and a data line on the substrate, a protective layer provided on the substrate to cover the thin film transistor, a hole within the protective layer positioned above an adjacent gate line, a pixel electrode provided on the protective layer and into the hole, wherein the pixel electrode is connected through the protective layer to the thin film transistor and a spacer positioned within the hole.

In another embodiment, a liquid crystal display device includes a black matrix formed on a substrate to define a pixel area, a color filter provided at the pixel area, a common electrode provided on the color filter, a hole within the common electrode overlapping the black matrix and a spacer positioned within the hole.

In another embodiment, a liquid crystal display device includes a black matrix formed on a substrate to define a pixel areas, color filters provided in the pixel areas, a hole between color filters overlapping the black matrix, a common electrode provided on the color filters and into the hole and a spacer positioned within the hole on the common electrode.

In another embodiment, a method of fabricating a liquid crystal display device includes the steps of forming a thin film transistor at an area adjacent an intersection between a gate line and a data line on a substrate, forming a protective layer covering the thin film transistor, forming a pixel electrode provided on the protective layer and passing through the protective layer to be electrically connected to the thin film transistor, defining a hole in a surface of the pixel electrode by patterning the pixel electrode on the protective layer above an adjacent gate line and depositing a spacer into the first hole using an ink-jet device.

In another embodiment, a method of fabricating a liquid crystal display device includes the steps of forming a black matrix to define a pixel area, forming a color filter at the pixel area, forming a common electrode on the color filter, defining a hole by patterning the common electrode at an area overlapping with the black matrix and depositing a spacer into the hole using an ink-jet device.

In another embodiment, a method of fabricating a liquid crystal display device includes the steps of forming a black matrix to define a pixel areas, forming color filters at the pixel areas, defining a hole by patterning the color filter areas at an area overlapping with the black matrix, forming a common electrode on the color filters and into the hole and depositing a spacer into the hole onto the common electrode within the hole using an ink-jet device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The principles of the invention will be apparent from the following detailed description of the embodiments of the present invention with reference to the following drawings.

DETAILED DESCRIPTION OF THE PREFERRED EMBODIMENTS

Figure 1:
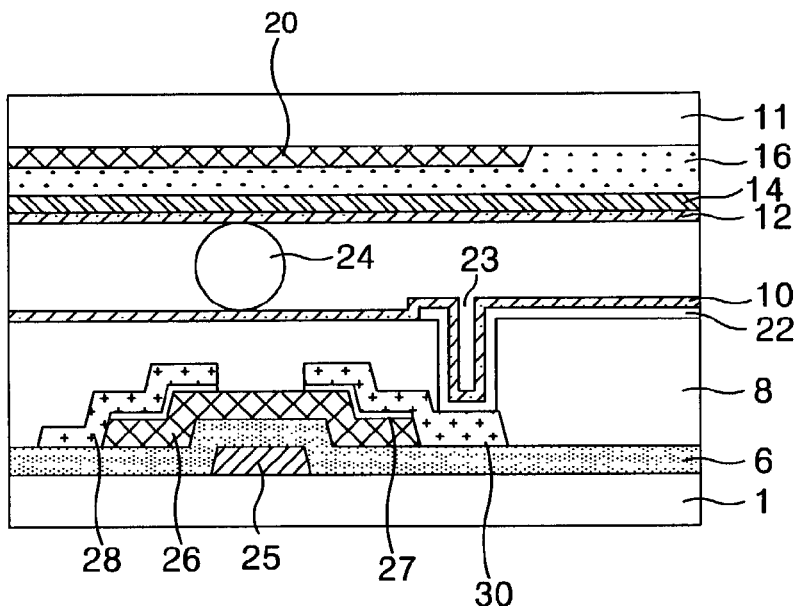
FIG. 1 is a cross-sectional view showing a structure of a conventional liquid crystal display.
Figure 2A:
FIGS. 2A to 2C are cross-sectional views showing a process for manufacturing a conventional pattern spacer.
Figure 2B:
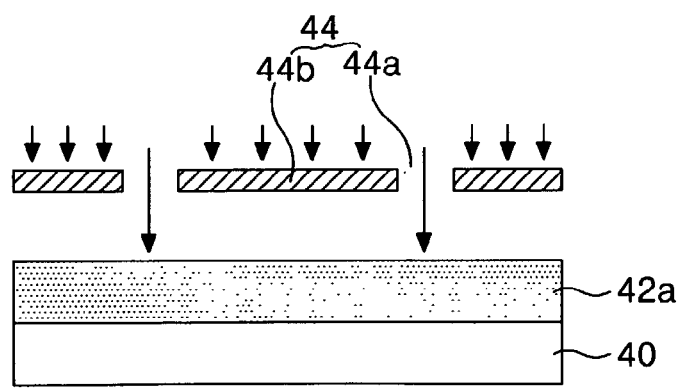
Figure 2C:
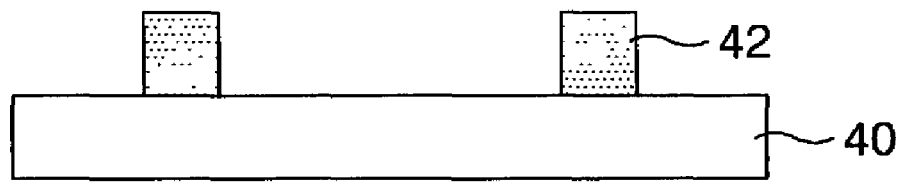
Figure 3:
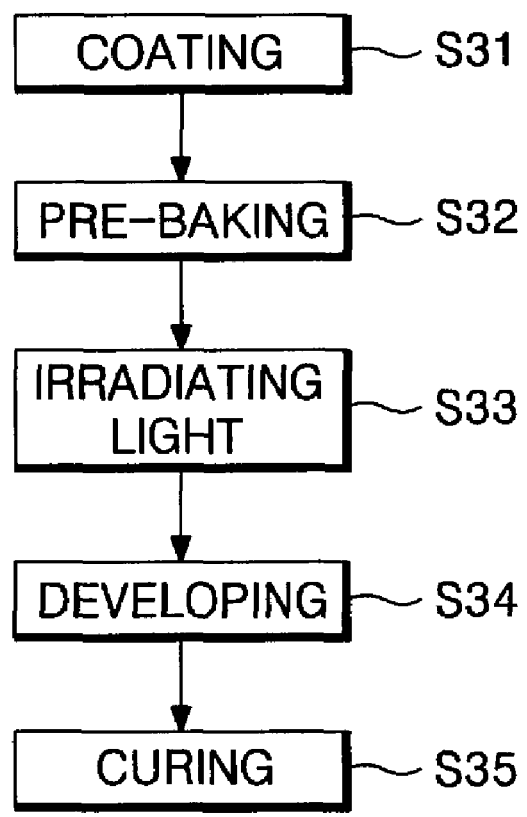
FIG. 3 is a flow chart representing the spacer manufacturing method shown in FIGS. 2A to 2C.
Figure 4A:
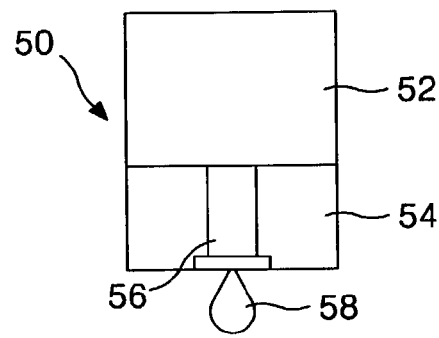
FIGS. 4A to 4C depict the conventional spacer manufacturing method employing an ink-jet system.
Figure 4A:
Figure 4B:
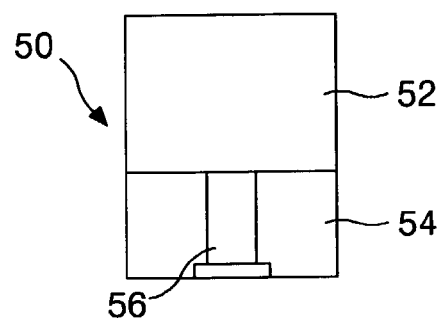
Figure 4B:
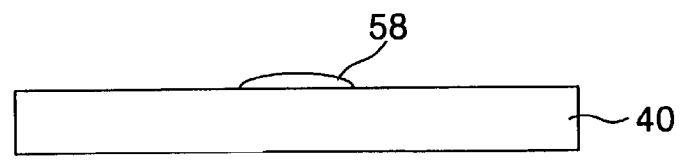
Figure 4C:
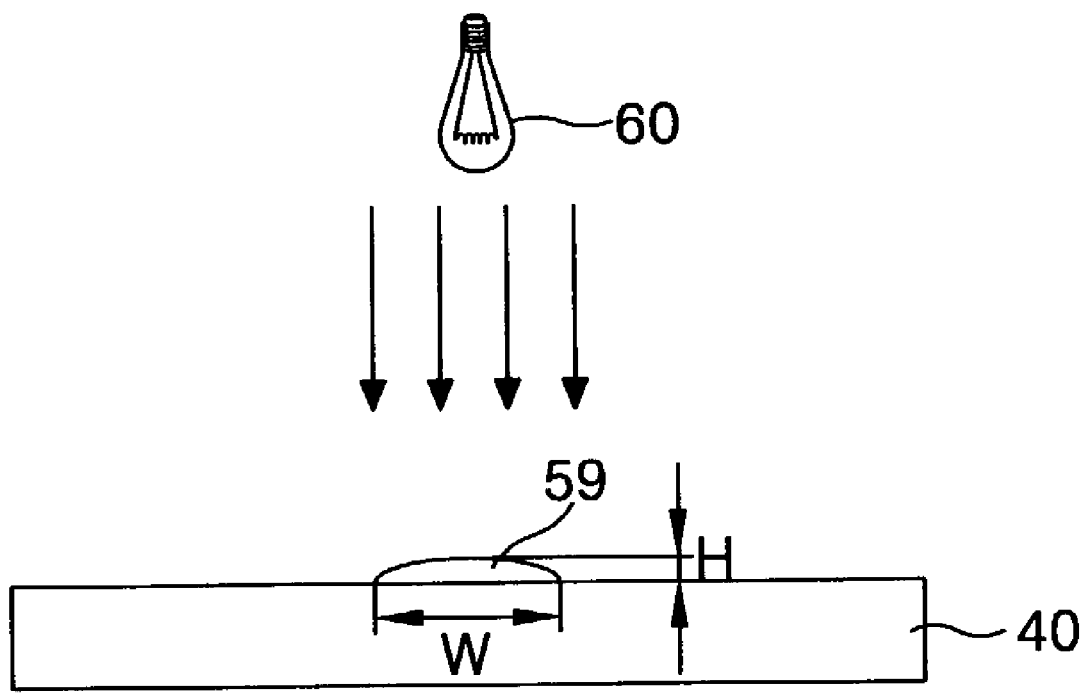
Figure 5:
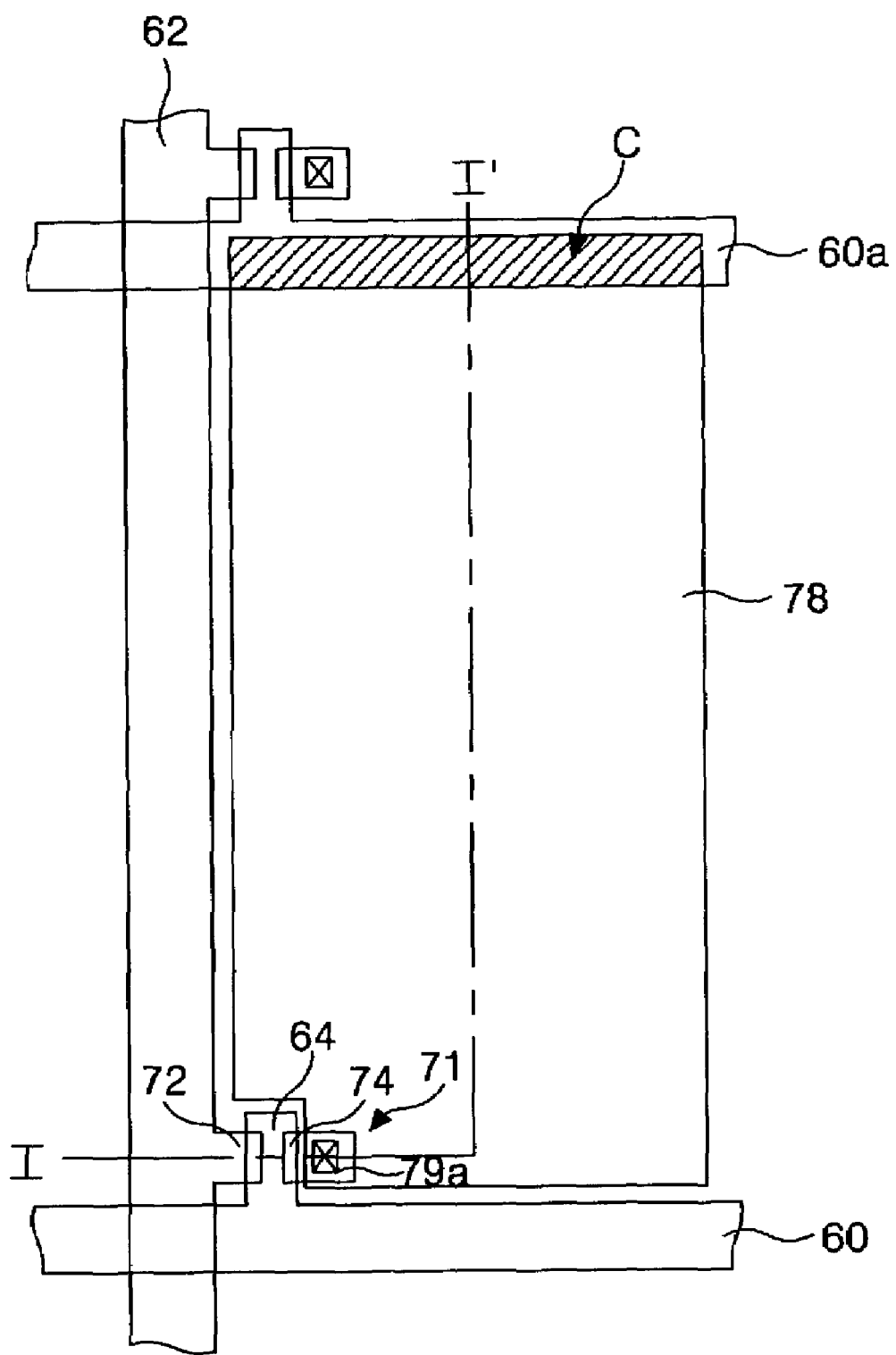
FIG. 5 illustrates a lower plate of a liquid crystal display according to an embodiment of the present invention.
Figure 6:
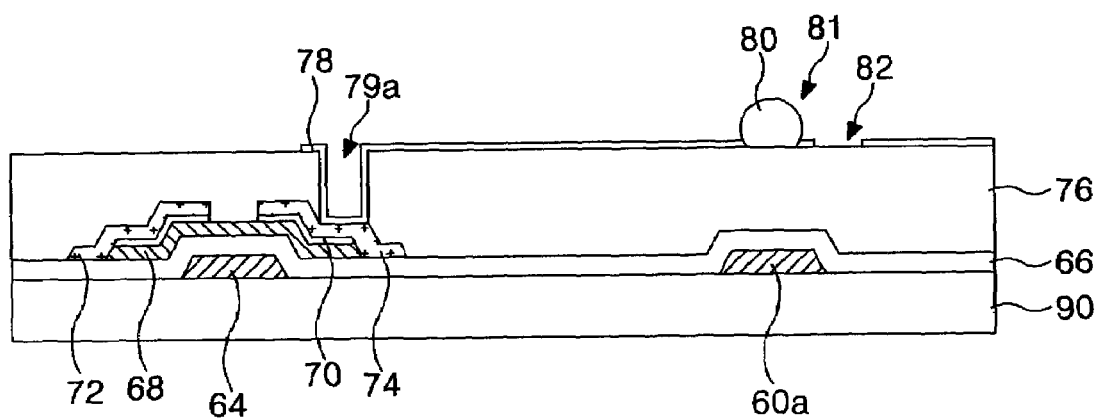
FIG. 6 is a cross-sectional view of the lower plate taken along the I-I' line in FIG. 5.

Reference will now be made in detail to the preferred embodiments of the present invention, examples of which are illustrated in the accompanying drawings. Referring to FIG. 5 and FIG. 6, a liquid crystal display (LCD) according to a first embodiment of the present invention has a spacer 80 formed in a hole 81 defined by patterning a pixel electrode 78 at an area C where the pixel electrode 78 overlaps the pre-stage gate line 60a or the gate line for other thin film transistors in another row of LCDs. The LCD further includes a thin film transistor (TFT) 71 provided at an area adjacent an intersection of a gate line 60 and a data line 62. A pixel electrode 78 is provided in a pixel area between gate lines 60 and 60a, and between data lines 62.

The spacer 80 plays a role in keeping a uniform gap between a lower plate and an upper plate (not shown), as shown in FIG. 6.

The TFT 71 is constructed by sequentially disposing a gate electrode 64, a gate insulating film 66, an active layer 68, an ohmic contact layer 70 and source and drain electrodes 72 and 74 onto a substrate 90. The gate electrode 64 is connected to the gate line 60 while the source electrode 72 is connected to the data line 62. The drain electrode 74 is in contact with the pixel electrode 78 via a contact hole 79a defined in a protective layer 76 for protecting the TFT 71. The pixel electrode 78 is patterned such that a hole is formed in the pixel electrode above the pre-stage gate line 60a. As a result, the spacer 80 can be stably formed in the patterned hole 81 of the pixel electrode 78 next to the edge of the pixel electrode 78 near the area 82 between the pixel electrode 78 and another pixel electrode.

Figure 7A:
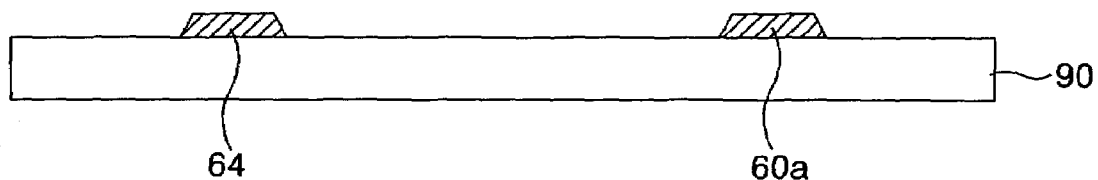
FIGS. 7A to 7F show a process of fabricating the lower plate shown in FIG. 6 step by step.

FIGS. 7A to 7F illustrate a method of fabricating the lower plate shown in FIG. 6 step by step. As shown in FIG. 7A, the gate electrode 64 is provided on a lower substrate 90. The gate electrode 64 is formed, along with the gate line 60, by forming a metal thin film with a deposition method, such as sputtering. Then, the deposited metal is patterned using a photolithography with a wet etching technique. The gate electrode 64 is made from a metal material such as aluminum (Al) or copper (Cu). An aqueous solution, such as $(NH_4)_2S_2O_8$, can be used as an etchant liquid.

Figure 7B:
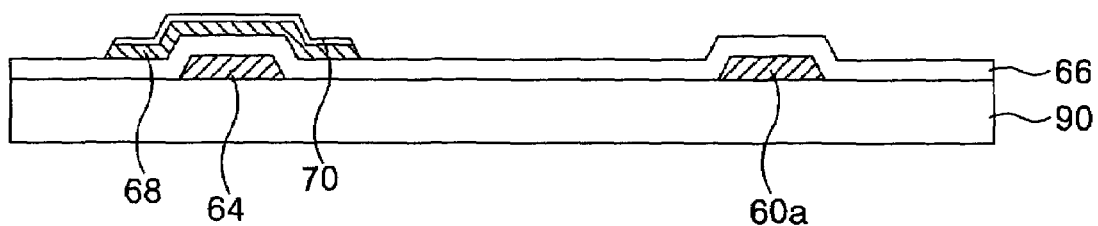

Referring to FIG. 7B, the gate insulating film 66, the active layer 68 and the ohmic contact layers 70 are sequentially disposed on a lower substrate 90 provided with the gate electrode 64. The gate insulating film 66 is formed by depositing an insulating material, such as silicon nitride or silicon oxide, onto the transparent substrate 90 and gate electrodes 60 and 64a. The active layer 68 and the ohmic contact layers 70 are formed by sequentially depositing an amorphous silicon layer and an amorphous silicon layer doped with an impurity on the gate insulating film 66 using a chemical vapor deposition (CVD) technique and then separately patterning them using photolithography.

Figure 7C:
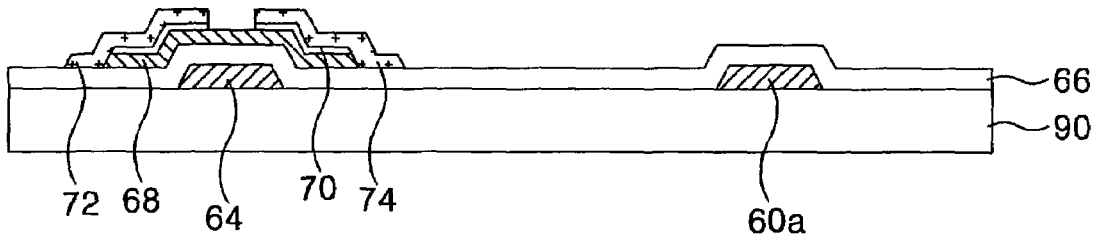

Subsequently, as shown in FIG. 7C, the source and drain electrodes 72 and 74 are formed on the gate insulating film 66 to cover the ohmic contact layers 70. The source and drain electrodes 72 and 74 are formed, along with the data line 62, by depositing a metal onto the gate insulating film 16 to cover the ohmic contact layers with a CVD or sputtering process. Then the source and drain electrodes are patterned using photolithography. The source and drain electrodes 72 and 74 are made from molybdenum (Mo) or a molybdenum alloy such as MoW, MoTa or MoNb. An aqueous solution, such as $(NH_4)_2S_2O_8$, is used as an etchant liquid with the photolithography. Then, a wet etching is used to form the ohmic contact layers 70 between the source and drain electrodes 72 and 74 exposes the active layer 68 between the source and drain electrodes 72 and 74. The source and drain electrodes 72 and 74 are spaced to make a channel in correspondence with the gate electrode 64. When a scanning pulse is applied to the gate electrode 64, the source and drain electrodes 72 and 74 are electrically connected via the channel through the active layer 68.

Figure 7D:
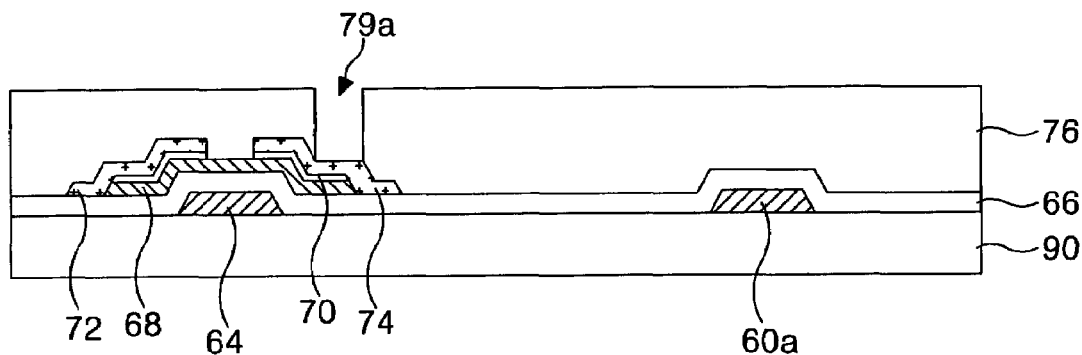

Referring to FIG. 7D, a protective layer 76 is then formed on a lower substrate 90 provided with the TFT 71. The protective layer 76 is formed by depositing an insulating material and then patterning it to form a contact hole 79a for exposing the drain electrode 74.

Figure 7E:
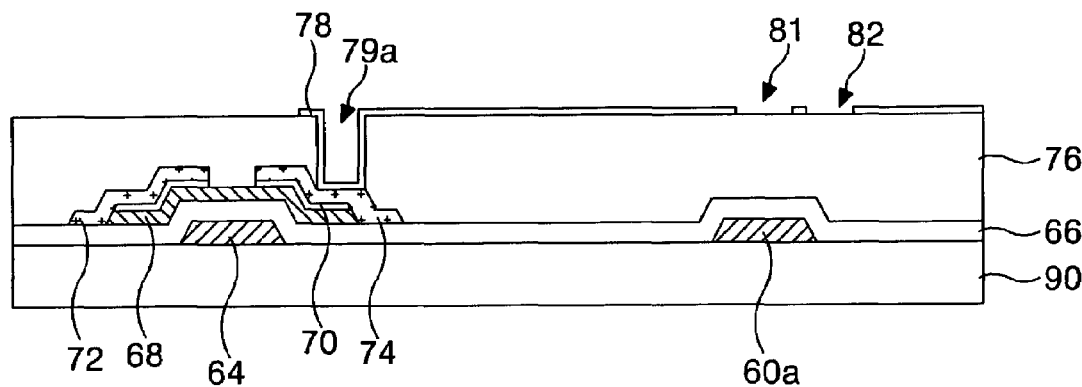

As shown in FIG. 7E, a pixel electrode 78 is then provided on the protective layer 76. The pixel electrode 78 is formed by depositing a transparent conductive material such as indium-tin-oxide (ITO), indium-zinc-oxide (IZO) or indium-tin-zinc-oxide (ITZO) and then patterning it. As a result of the patterning, the pixel electrode 78 is provided in a pixel area a hole 81 in the top surface of the pixel electrode 78. The hole 81 is above and overlaps the pre-stage or adjacent gate line 60a. The pixel electrode 78 of one pixel cell is spaced from other pixel electrodes of adjacent pixel cells or LCDs with a desired gap 82, as shown in FIG. 7E. The pixel electrode 78 is in electrical contact with the drain electrode 74 via a contact hole 79a.

Figure 7F:
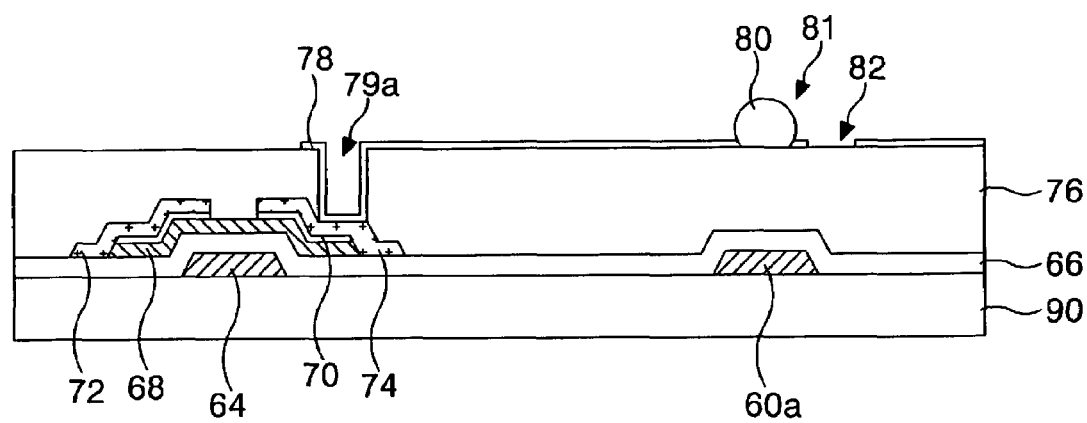

As shown in FIG. 7F, a spacer 80 is formed in the hole 81 of the pixel electrode 78. An ink-jet device (not shown) is aligned with the hole 81 of the pixel electrode 78 and thereafter a spacer 80 is jetted into the hole 81. As described above, a portion of the pixel electrode 78 overlapping with the gate line is removed or patterned to define the hole 81 in a top surface of the pixel electrode 78, and then the spacer 80 is jetted into the hole 81 using an ink-jet device. Since the spacer 80 can be jetted into the hole 81, it is deposited accurately at a desired position and a size of the spacer 80 can be adjusted or controlled by the size of the hole 81 in the top surface of the pixel electrode 78. In other words, the spacer 80 is formed only within the hole in the top surface of the pixel electrode 78, so that the material of the spacer does not widely spread, thereby obtaining a desired spacer height with less spacer width.

Figure 8:
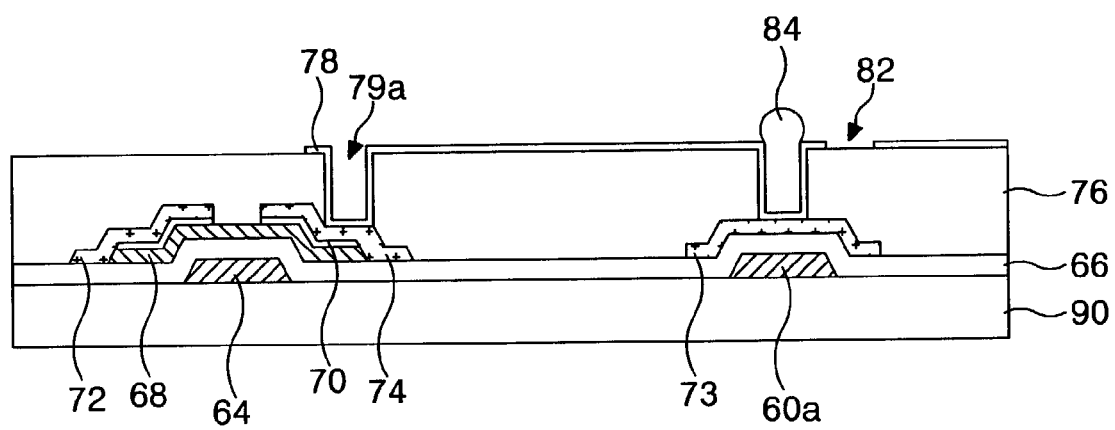
FIG. 8 illustrates a lower plate of a liquid crystal display according to a second embodiment of the present invention.
Figure 9A:
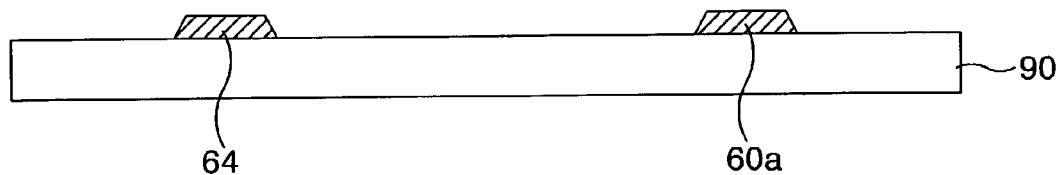
FIGS. 9A to 9F show a process of fabricating the lower plate shown in FIG. 8 step by step.

FIG. 8 shows a lower plate of a liquid crystal display according to a second embodiment of the present invention. FIGS. 9A to 9F illustrate a method of fabricating the lower plate shown in FIG. 8 step by step. Referring to FIG. 9A, the gate electrode 64 is provided on a lower substrate 90. The gate electrode 64 is formed, along with the gate line 60a, by forming a metal thin film using a deposition method, such as sputtering. Then, the deposited metal film is patterned using photolithography with a wet etching technique.

Figure 9B:
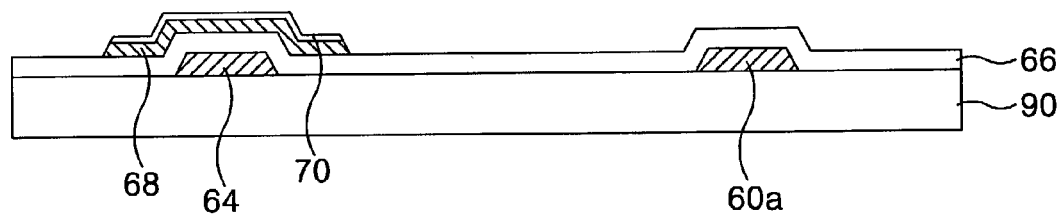

Next, as shown in FIG. 9B, the gate insulating film 66 is formed on a lower substrate 90 to cover the gate electrode 64. An active layer 68 and an ohmic contact layer 70 are sequentially disposed on the gate insulating film 66. Then the active layer 68 and an ohmic contact layer 70 are patterned using photolithography.

Figure 9C:
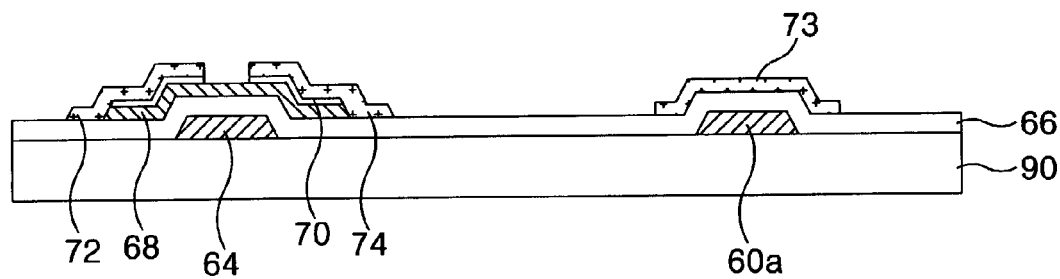

Subsequently, as shown in FIG. 9C, the source and drain electrodes 72 and 74 are formed on the gate insulating film 66 to cover the ohmic contact layers 70. The source and drain electrodes 72 and 74 are formed, along with the data line 62, by depositing a metal onto the gate insulating film 16 to cover the ohmic contact layers with a CVD or sputtering process. Then, the source and drain electrodes are patterned using photolithography. The source and drain electrodes 72 and 74 are made from molybdenum (Mo) or a molybdenum alloy such as MoW, MoTa or MoNb. An aqueous solution, such as $(NH_4)_2S_2O_8$, is used as an etchant liquid with the photolithography. Next, a wet etching is used to form the ohmic contact layers 70 between the source and drain electrodes 72 and 74 exposes the active layer 68 between the source and drain electrodes 72 and 74. The source and drain electrodes 72 and 74 are spaced to make a channel in correspondence with the gate electrode 64. When a scanning pulse is applied to the gate electrode 64, the source and drain electrodes 72 and 74 are electrically connected via the channel through the active layer 68. Additionally, the storage capacitor electrode 73 formed on the pre-stage gate line 60a after patterning the source and drain electrodes.

Figure 9D:
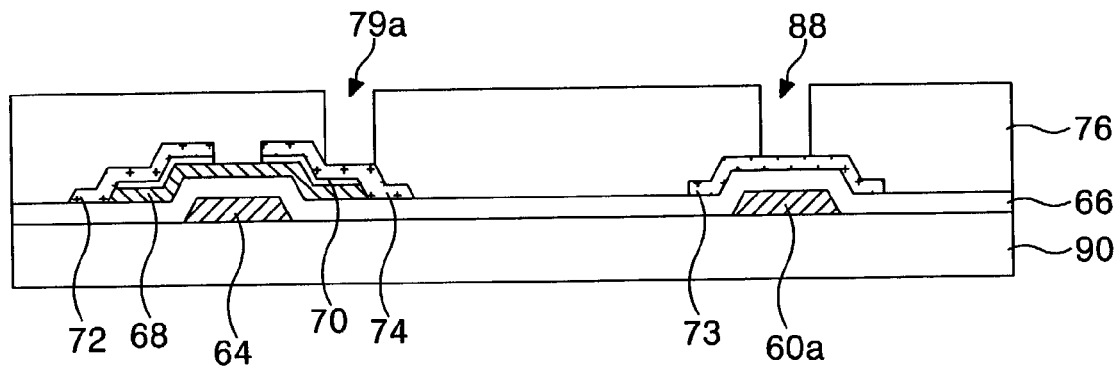

Referring to FIG. 9D, a protective layer 76 is formed on a lower substrate 90 provided with a TFT 71. The protective layer 76 is formed by depositing an insulating material and then patterning it to form a contact hole 79a for exposing the drain electrode 74. In addition, the protective layer 76 is patterned to form a spacer hole 88 through the protective layer 76 down to the storage capacitor electrode 73 over the pre-stage gate line 60a.

Figure 9E:
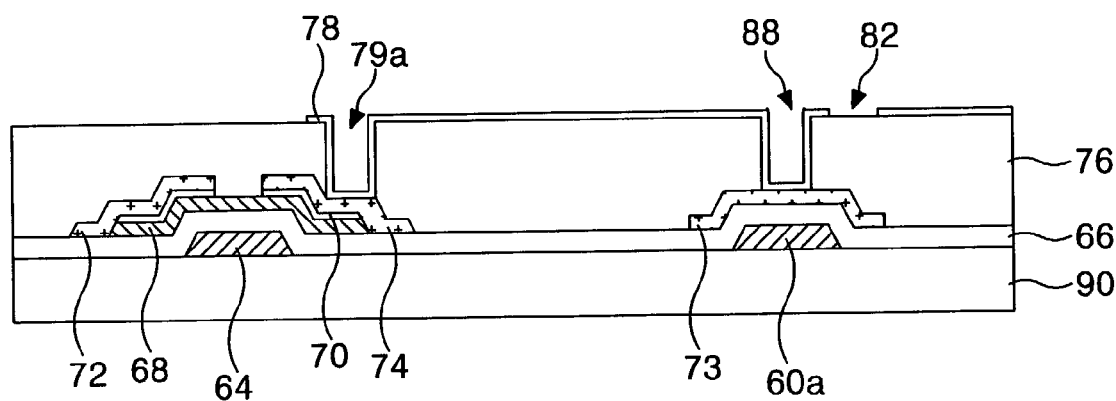

As shown in FIG. 9E, a pixel electrode 78 is provided on the protective layer 76. The pixel electrode 78 is formed by depositing a transparent conductive material such as indium-tin-oxide (ITO), indium-zinc-oxide (IZO) or indium-tin-zinc-oxide (ITZO) and then patterning it. The pixel electrode 78 of one pixel cell is spaced at a desired gap 82 from pixel electrodes of adjacent pixel cells. The pixel electrode 78 is in electrical contact with the drain electrode 74 via a contact hole 79a. The pixel electrode 78 can be deposited into a spacer hole 88 such that the pixel electrode extends into and out of the spacer hole 88.

As shown in FIG. 9E, the pixel electrode can be connected to the capacitor electrode 73 on the gate insulating film 66 directly above the pre-stage or adjacent gate line 60a. Such the capacitor electrode 73 connected to the pixel electrode assists in maintaining a charge on the pixel electrode with respect to the pre-stage line 60a.

Figure 9F:
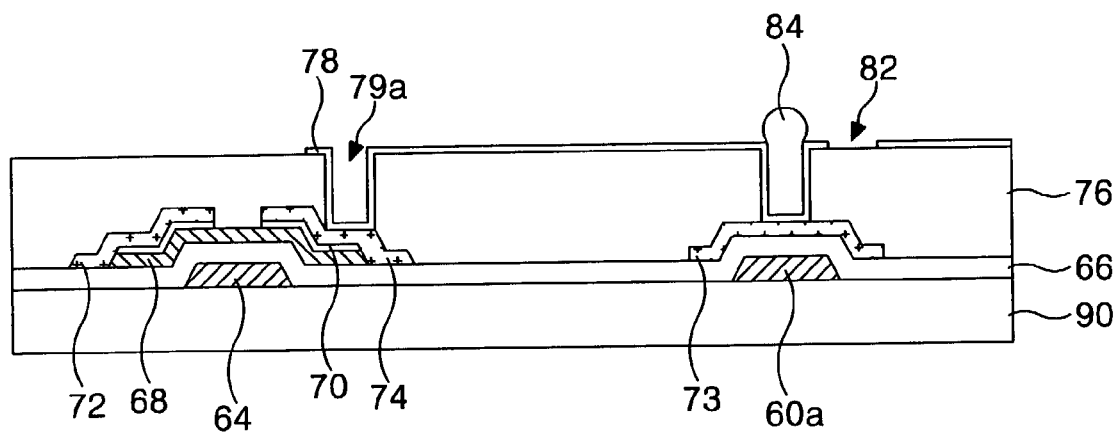

Finally, as shown in FIG. 9F, a spacer 84 is formed in the spacer hole 88. An ink-jet device (not shown) is aligned with the spacer hole 88. Thereafter, a material for spacer 84 is jetted into the spacer hole 88.

As described above with regard to FIG. 8 and FIGS. 9A to 9F, the protective layer 76 at an area above and overlapping with the pre-stage or adjacent gate line 60a is patterned to define the spacer hole 88. After a pixel electrode 78 is patterned, the spacer 84 is jetted into the spacer hole 88 using an ink-jet device. The spacer hole 88 positions the spacer 84 accurately at a desired position and controls the size of the spacer 84. In other words, the spacer 84 is formed only in the spacer hole 88, so that the material of the spacer does not widely spread to thereby obtain a desired spacer height with less spacer width.

Figure 10:
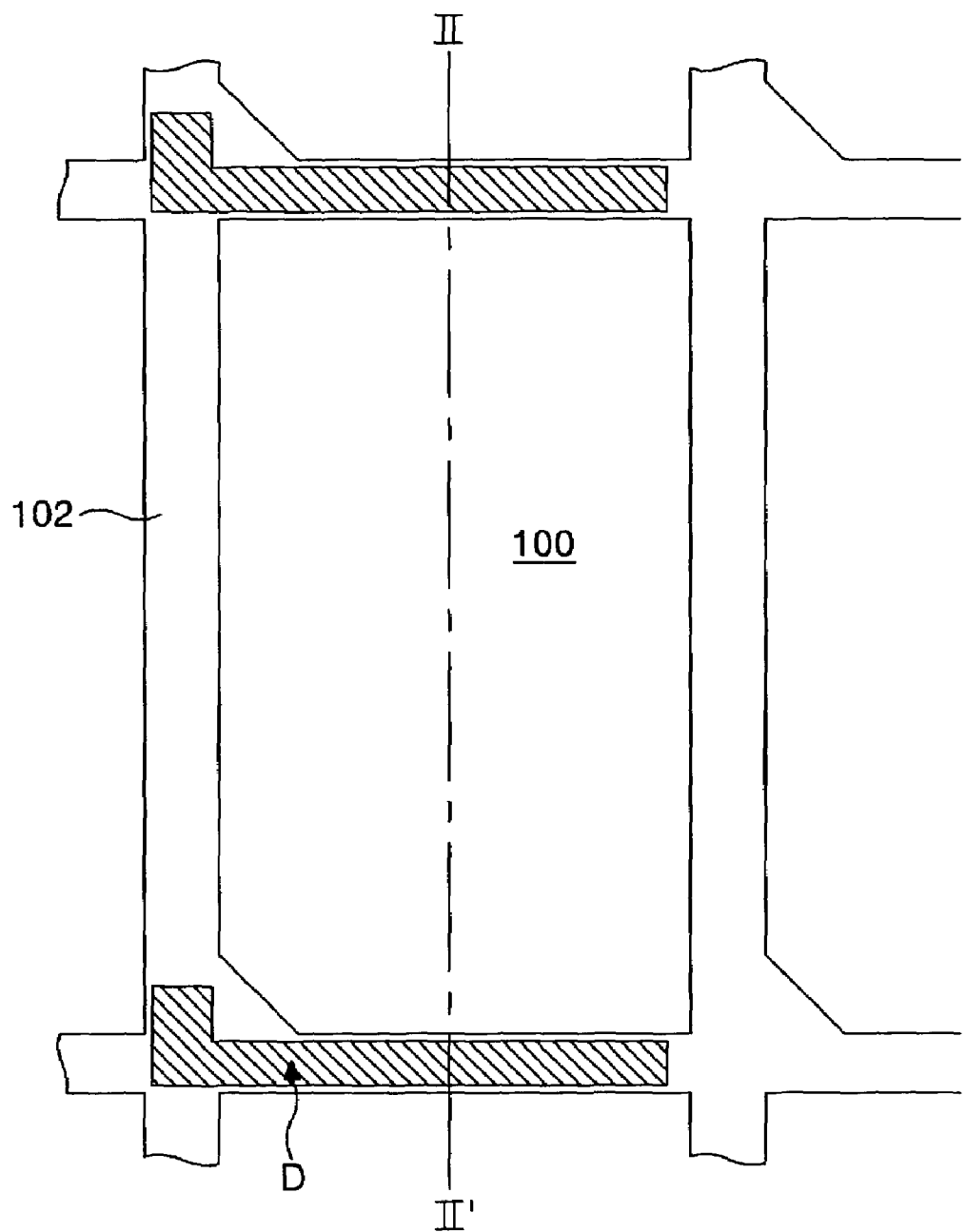
FIG. 10 illustrates an upper plate of a liquid crystal display according to a third embodiment of the present invention.
Figure 11:
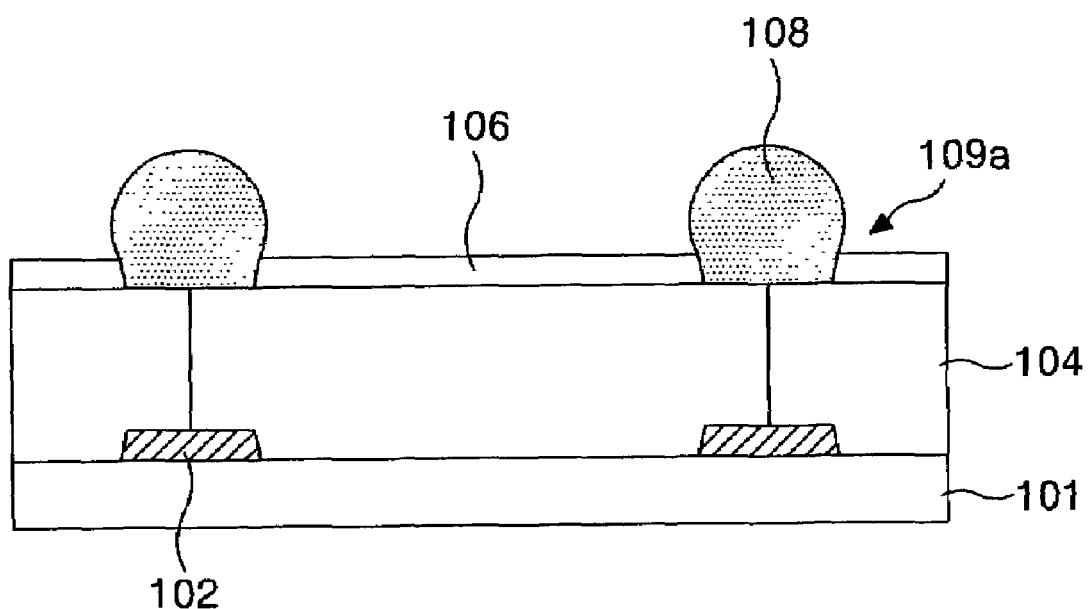
FIG. 11 is a section view of the upper plate taken along the II-II' line in FIG. 10.

FIG. 10 shows an upper plate of a LCD according to a third embodiment of the present invention. FIG. 11 is a sectional view of the upper plate taken along the II-II' line shown in FIG. 10. Referring to FIG. 10 and FIG. 11, in the LCD, a common electrode 106 at an area D corresponding to a black matrix 102 is patterned to define a spacer holes 109a. Spacers 108 are jetted into the spacer holes 109a with an ink-jet device or ink-jet system having respective ink jets for different positions.

In the upper plate of the LCD, the black matrix 102, a color filter 104 and the common electrode 106 are sequentially disposed on an upper substrate 101. The common electrode 106 is patterned in an area corresponding to the black matrix 102 to define the spacer hole 109a in which the spacer 108 is formed.

The black matrix 102 is formed in an area of the upper plate corresponding to a TFT area of the lower plate and an area of the upper substrate 101 above and overlapping with the gate line and the data line of the lower plate, and defines a cell area 100 in which the color filter 104 is formed. The color filter 104 provided in the area defined by the black matrix 102. The color filter 104 transmits a specific wavelength of color light to implement red, green or blue colors. The black matrix 102 plays a role in preventing light leakage and absorbing an external light thereby enhancing contrast. A common voltage Vcom is applied to the common electrode 106, which together with a pixel voltage of the pixel electrode, generates a voltage difference that drives the liquid crystal. The spacer 108 keeps a cell gap between the upper plate and the lower plate.

Figure 12A:
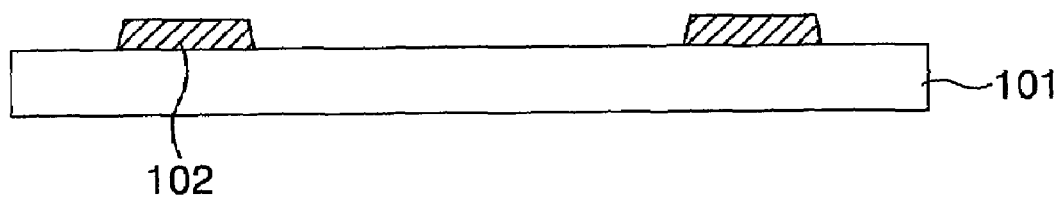
FIGS. 12A to 12D show a process of fabricating the upper plate shown in FIG. 11 step by step.

FIGS. 12A to 12D show a method of fabricating the upper plate shown in. FIG. 11 step by step. Referring to FIG. 12A, the black matrix 102 is formed on the upper substrate 101. The black matrix 102 can be formed by depositing a metal film, such as chrome (Cr), and then patterning it using photolithography. Since the metal film undergoes a complex deposition process, a black resin is usually used so as to reduce the number of process steps and equipment need. For example, black resin eliminates the necessity of deposition equipment in comparison to the metal film. In addition, coating the black resin on the upper plate, exposing it through a mask and then developing it can reduce the number of processes dramatically. However, since the black resin is more transmissive of light than a metal film, the black resin should be thicker than a metal film. For example, a metal film can be formed with a thickness of about 1000 to 2000 Å to shut off light, whereas the black resin is formed to a thickness of about 1 µm. The black matrix 102 defines an area where the color filter 104 is to be formed and is formed on the upper plate opposite to the gate and data line areas on the lower plate.

Figure 12B:
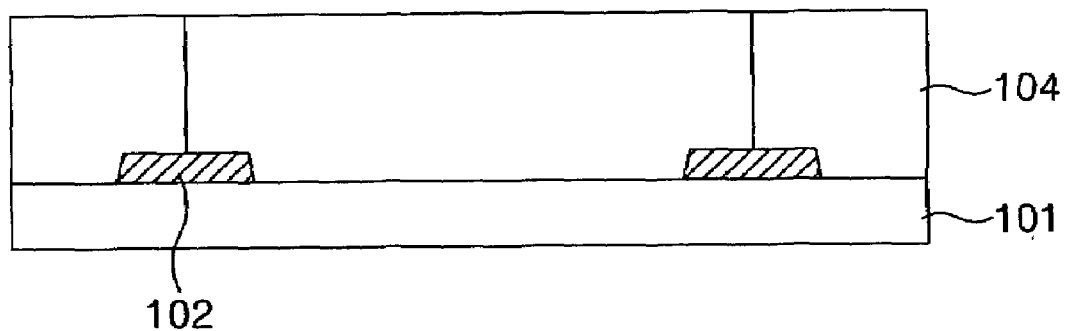

As shown in FIG. 12B, the color filter 104 is formed in the cell area defined by the black matrix 102. The color filter 104 is either a red color filter resin, a green color filter resin and a blue color filter resin in each cell area so as to implement red, green or blue color. Thereafter, the color filter resins are cured to complete the color filter 104. The curing process is a process of applying a temperature to remove a solvent left within the color filter resin. The curing process removes the solvent left within the color filter resin to make the color filter 104.

Figure 12C:
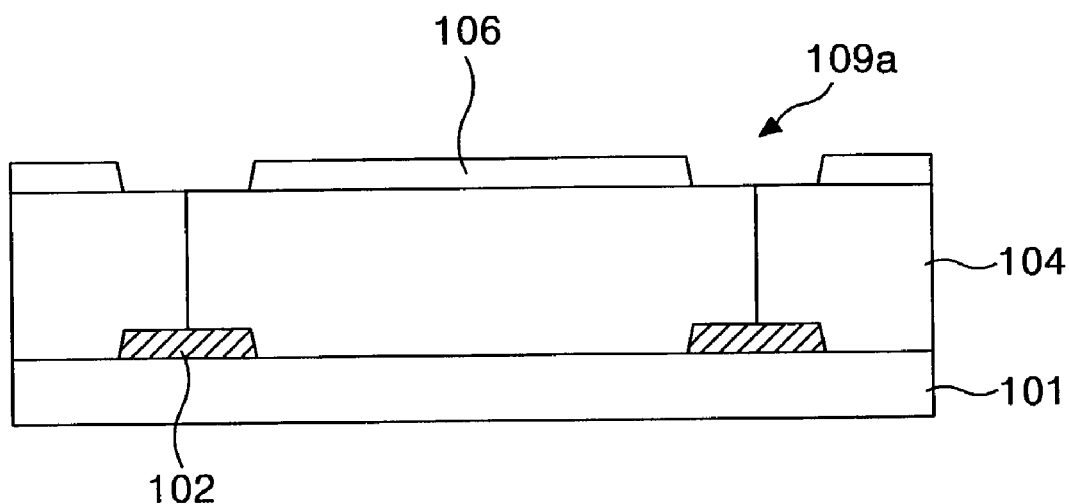

Subsequently, as shown in FIG. 12C, the common electrode 106 is provided on the color filter 104. The common electrode 106 is patterned at an area corresponding to the black matrix 102 to define a spacer holes 109a. The spacer holes 109a are formed overlapping and above the black matrix 102, which overlaps gate lines on the lower plate.

Figure 12D:
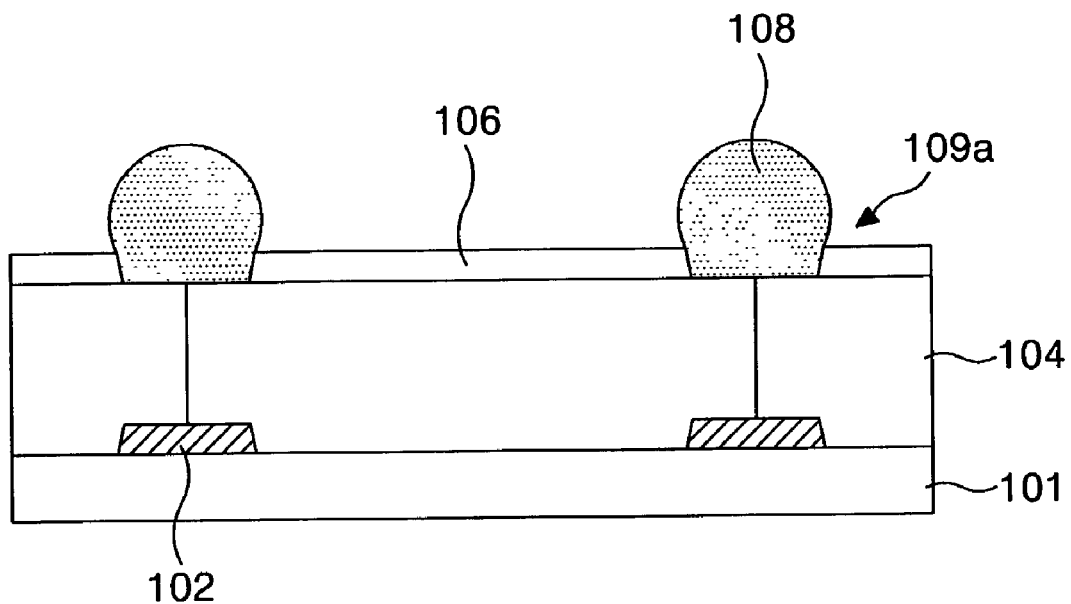

As shown in FIG. 12D, spacers 108 are provided in the spacer holes 109a. The spacers 108 are deposited into spacer holes 109a each having the same size. An ink-jet device can be used to jet the spacers into the spacer holes 109a.

As described above, after the spacer holes 109a are defined in an area of the upper plate overlapping the gate lines on the lower plate, the spacers 108 are formed in the spacer holes 109a. The spacer holes 109a have a constant size, so that the spacers 108 also have a constant size and can be positioned accurately. In other words, the spacers 108 are provided only at the spacer holes 109a, so that they spread less widely than the conventional art to thereby obtain a desired height with less width.

Figure 13:
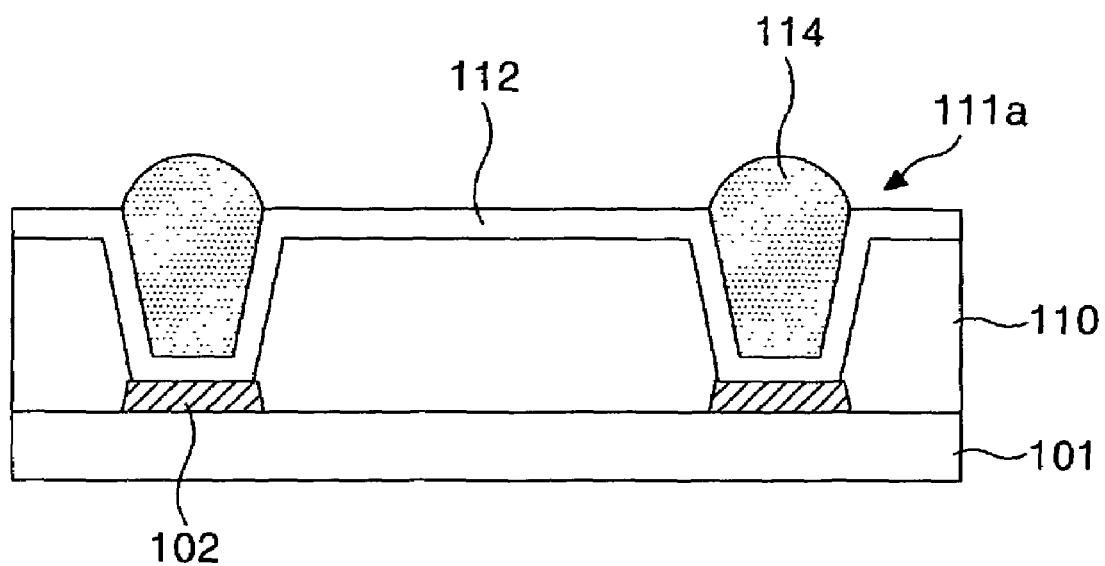
FIG. 13 illustrates an upper plate of a liquid crystal display according to a fourth embodiment of the present invention.

FIG. 13 shows an upper plate of a LCD according to a fourth embodiment of the present invention.

Referring to FIG. 13, in the LCD, a color filter 110 at an area corresponding to a black matrix 102 is patterned to define a spacer hole 111a. After a common electrode 112 was formed, a spacer material is jetted into the spacer hole 111a by an ink-jet device to provide spacers 114. FIGS. 14A to 14D show a method of fabricating the upper plate shown in FIG. 13 step by step.

Figure 14A:
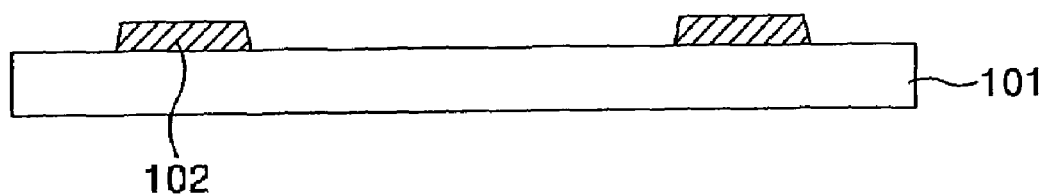
FIGS. 14A to 14D show a process of fabricating the upper plate shown in FIG. 13 step by step.

Referring to FIG. 14A, the black matrix 102 is formed on the upper substrate 101. The black matrix 102 is formed with a black resin to define a cell area where the color filter 110 is to be formed. The black matrix 102 on the upper plate is formed opposite to the gate and data line areas on the lower plate.

Figure 14B:
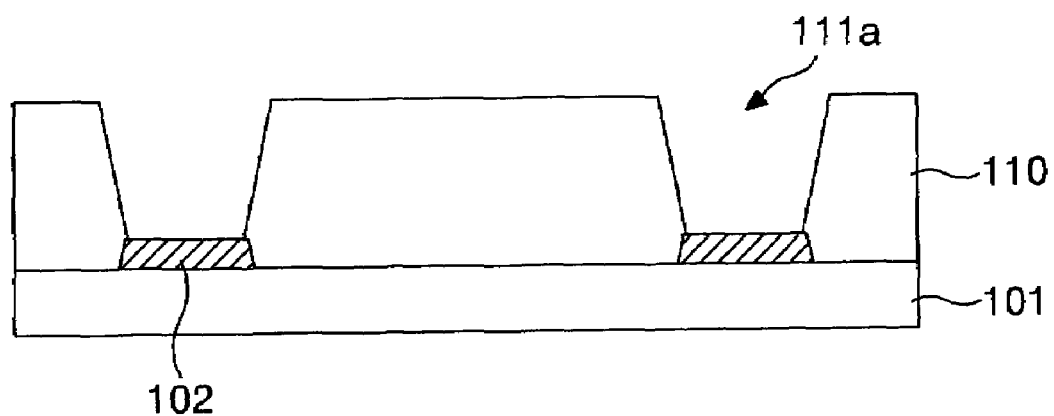

As shown in FIG. 14B, the color filter 110 is formed at the cell area defined by the black matrix 102. The spacer hole 111a is defined in color filters by patterning an area corresponding to the black matrix using photolithography. The spacer holes 111a are formed in the color filters and correspond to the black matrix 102 above and overlapping with the gate lines on the lower plate. A color filter 110 includes one of a red filter resin, a green filter resin and a blue filter resin at each cell area 100 to implement one of the red, green or blue colors. Thereafter, the red, green or blue color filter resin is cure, thereby completing the color filter 110.

Figure 14C:
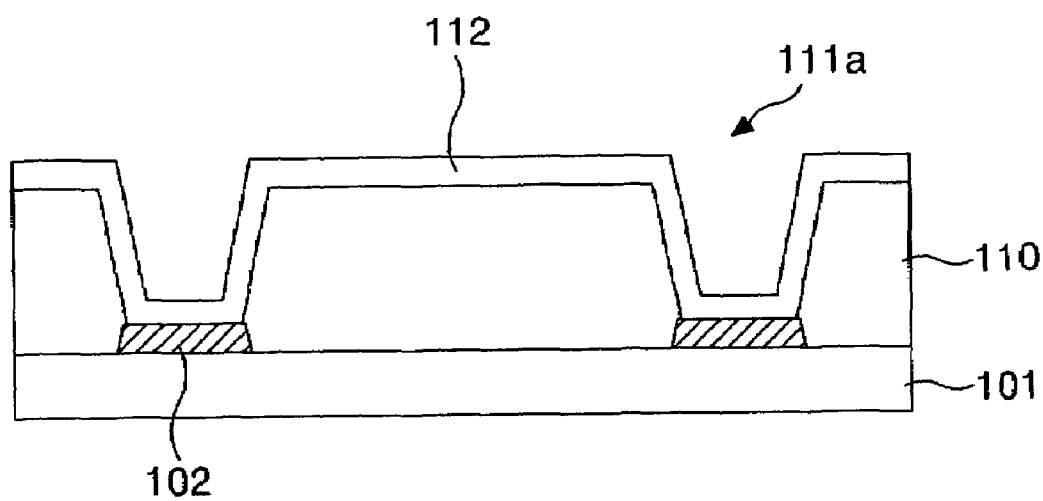

Subsequently, as shown in FIG. 14C, the common electrode 112 is provided on the color filter 112 and in the spacer hole 111a. The common electrode 112 can be patterned at an area corresponding to the black matrix 102. Alternatively, the common electrode 112 may be provided on the color filter 110 and the black matrix 102 as shown in FIG. 14C.

Figure 14D:
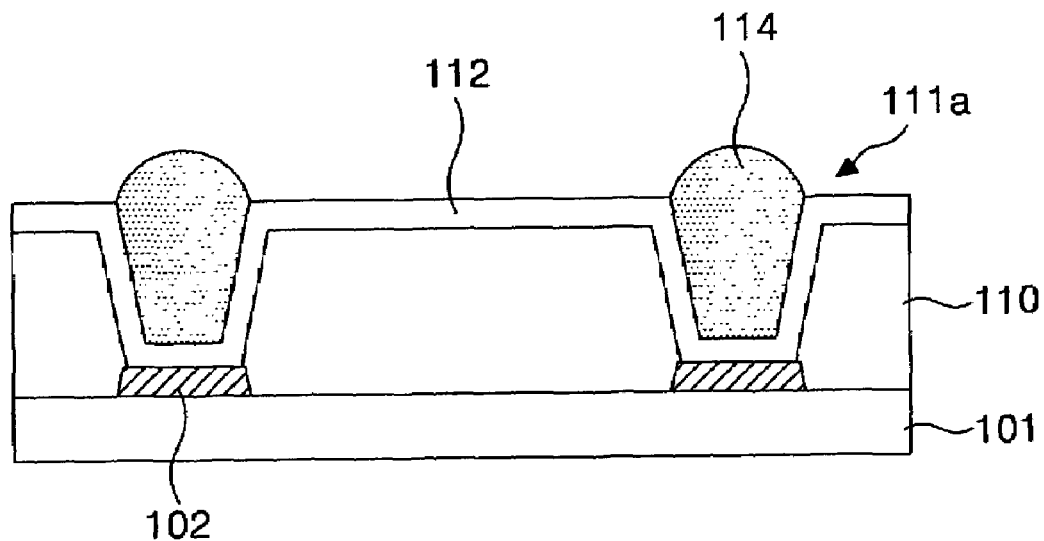

As shown in FIG. 14D, spacers 114 are provided in the spacer holes 111a. The spacers 114 are jetted into the spacer holes 111a using an ink-jet device. Since the spacer holes 111a have a constant size, the spacers 114 will also have a constant size.

As described above, after the spacer holes 111a were defined in an area above and overlapping the black matrix 102, the spacer 114 is formed in the spacer hole 111a. The spacer hole 111a has a constant size, so that the spacer 114 also has a constant size and can be positioned accurately. In other words, the spacer 114 is provided only in the spacer hole 111a to prevent the spacer material from spreading widely, so that it becomes possible to obtain a spacer with desired height with a reduced width.

As described above, according to the present invention, a portion of the pixel electrode overlapping with the pre-stage gate line is removed to define a hole, or the protective layer overlapping with the gate line are patterned to define a hole. Alternatively, the common electrode at an area overlapping with the black matrix is removed to define a hole, or the color filter overlapping with the black matrix to define a hole. Subsequently, a spacer is jetted into the hole by an ink-jet device. The height of a spacer formed in a hole is based upon the hole retaining the width of the spacer. Accordingly, it becomes possible to obtain spacers of a certain height consistently. In other words, a height of spacers can be controlled using holes such that spacers can be consistently formed having the same height.

It will be apparent to those skilled in the art that various modifications and variations can be made in the apparatus and method for fabricating a liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a substrate;
   a thin film transistor provided at an area adjacent to an intersection of a gate line and a data line on the substrate;
   a protective layer provided on the substrate to cover the thin film transistor;
   a pixel electrode provided on the protective layer and connected to the thin film transistor through a contact hole of the protective layer, the pixel electrode defining a first hole that is positioned above an adjacent gate line; and
   a spacer positioned within the first hole such that a lower part of the spacer is entirely encircled by the pixel electrode, wherein a bottom surface of the spacer directly contacts the protective layer.

2. The liquid crystal display device of claim 1, wherein the first hole overlaps the adjacent gate line.

3. A method of fabricating a liquid crystal display device, comprising the steps of:

forming a thin film transistor at an area adjacent an intersection between a gate line and a data line on a substrate;

forming a protective layer covering the thin film transistor;

forming a pixel electrode provided on the protective layer and passing through a contact hole of the protective layer to be electrically connected to the thin film transistor;

forming a hole in a surface of the pixel electrode by patterning the pixel electrode on the protective layer above an adjacent gate line; and depositing a spacer onto the protective layer exposed by the first hole using an ink-jet device such that a lower part of the spacer is entirely encircled by the pixel electrode, wherein a bottom surface of the spacer directly contacts the protective layer.

4. The method of claim 3, wherein the first hole within the pixel electrode overlaps the adjacent gate line.

* * * * *